United States Patent
Olander et al.

(10) Patent No.: US 9,949,441 B2
(45) Date of Patent: Apr. 24, 2018

(54) VARIABLE SPEED ROUND BALE CHAMBER CONTROL WITH ACCUMULATOR SENSOR

(71) Applicant: AGCO Corporation, Duluth, GA (US)

(72) Inventors: Brian Olander, Buhler, KS (US); Maynard Herron, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 976 days.

(21) Appl. No.: 14/368,053

(22) PCT Filed: Dec. 24, 2012

(86) PCT No.: PCT/US2012/071575
§ 371 (c)(1),
(2) Date: Jun. 23, 2014

(87) PCT Pub. No.: WO2013/096957
PCT Pub. Date: Jun. 27, 2013

(65) Prior Publication Data
US 2014/0345481 A1    Nov. 27, 2014

Related U.S. Application Data

(60) Provisional application No. 61/579,789, filed on Dec. 23, 2011.

(51) Int. Cl.
*A01F 15/10* (2006.01)
*A01F 15/07* (2006.01)
*A01F 15/08* (2006.01)

(52) U.S. Cl.
CPC ........ *A01F 15/106* (2013.01); *A01F 15/0705* (2013.01); *A01F 15/08* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,431,981 B1 * | 8/2002 | Shinners | A01D 43/085 460/6 |
| 2002/0011061 A1 * | 1/2002 | Lucand | A01D 90/04 56/341 |

(Continued)

FOREIGN PATENT DOCUMENTS

| | | | | |
|---|---|---|---|---|
| DE | 102011111401 A1 * | 2/2013 | ......... | A01F 15/0705 |
| EP | 2 196 082 A1 | 6/2010 | | |

OTHER PUBLICATIONS

European Patent Office, International Search Report for International Application No. PCT/US2012/071575 dated Apr. 12, 2013.

*Primary Examiner* — Alicia Torres

(57) ABSTRACT

A sensor detects a characteristic of accumulated crop material and a controller manipulates the speed of a baling chamber in response thereto. The speed of a baling chamber of a variable speed baler is manipulated in response to a characteristic of an accumulated crop material. For example, the height of accumulated crop material in an accumulation area may be detected and the speed of the baling chamber manipulated in response thereto. The rate of growth of the bale may also be determined and used in manipulating the speed of the baling chamber.

4 Claims, 5 Drawing Sheets

(52) U.S. Cl.
CPC ...... *A01F 15/0825* (2013.01); *A01F 15/0833* (2013.01); *A01F 15/10* (2013.01)

(56) References Cited

U.S. PATENT DOCUMENTS

| | | | |
|---|---|---|---|
| 2004/0083704 A1* | 5/2004 | Lucand | A01F 15/106 56/341 |
| 2006/0016166 A1 | 1/2006 | Dubois | |
| 2007/0175198 A1* | 8/2007 | Viaud | A01F 15/0833 56/341 |
| 2010/0122632 A1* | 5/2010 | Biziorek | A01F 15/0715 100/2 |
| 2010/0154662 A1* | 6/2010 | Fukayo | A01D 80/00 100/100 |
| 2011/0191001 A1 | 8/2011 | Viaud | |
| 2012/0096827 A1 | 4/2012 | Chaney et al. | |

* cited by examiner

VARIABLE SPEED ROUND BALE CHAMBER CONTROL WITH ACCUMULATOR SENSOR

BACKGROUND OF THE INVENTION

Field of Invention

The present invention relates generally to round balers, and more specifically, to round balers with rotational baling chambers.

Description of Related Art

Conventional round balers receive crop material and form the crop material into compacted bales in a baling chamber. There are generally three major cycles in the operation of a round baler: a bale-forming cycle, a bale-wrapping cycle, and a bale-ejecting cycle. The baling chamber is typically run at a constant rotational speed throughout its bale-forming and bale-wrapping cycles.

An important part of operating a round baler is controlling the feed rate of material into the bale chamber. If too much material is fed to the bale chamber it can plug the baler, whereas if too little material is fed then the bale will deteriorate in the chamber. In a conventional round baler pulled with a tractor, controlling the feed rate is accomplished by varying the tractor's ground speed and engine speed. In a continuous round baler with an open accumulation area, there are several reasons why this method is inadequate. First, in order to minimize the cycle time and thus the amount of accumulated material, it is desirable to increase the bale chamber speed to reduce the bale wrapping time. In addition, if the baler is towed behind a combine for collecting residue, the ground speed will be determined by the optimum combine speed for the grain harvest, and the material infeed rate to the baler cannot be changed this way. Furthermore, in a conventional round baler, tractor engine speed is varied to adjust the Power Take Off shaft (PTO) speed and thus the drive speed of the baler. If the baler is pulled by a combine, the engine will be run at full throttle for grain harvesting reasons, so the baler speed cannot be sufficiently adjusted by changing engine speed. In addition, the optimum baler speed may be significantly higher when feeding accumulated material into the baler than when feeding new (unaccumulated) material.

U.S. Patent Publication No. US 2011-0023732 A1, assigned to the assignee of the present invention, discloses a variable speed baler configured to vary the speed of a baling mechanism in accordance with the operational cycles of the baler. While such arrangements are useful there is room for improvement.

SUMMARY OF THE INVENTION

In an example embodiment, a variable speed baler is configured to vary the speed of a baling mechanism in response to characteristics of an accumulated crop material. In one example embodiment, the amount of crop material accumulated in an accumulation region is determined and the baling chamber speed is manipulated accordingly. The rate of bale growth in the baling chamber may also be determined and the speed of the bale chamber manipulated in response thereto. For example, it may be determined whether the bale in the baling chamber is growing or shrinking in size and the speed of the baling chamber manipulated in response. A user-provided speed variable may also be received and used in manipulating the speed of the bale chamber. The term "crop material" is intended to include grain and/or material other than grain (MOG), such as crop residue from a combine. For example, the baler may be used for baling hay or biomass material such as corn cobs or the like or a mixture of the two.

In one example embodiment, a variable speed baler comprises a baling chamber adapted to form crop material into a bale; a sensor to detect a characteristic of accumulated material in an accumulation area; and a variable speed drive configured to manipulate the speed of the baling chamber in response to the characteristic. For example, a height of accumulated crop material may be determined by the sensor and the speed of the baling chamber may be manipulated in response. The variable speed baler may further comprise a sensor for determining a characteristic of a bale in the baling chamber, such as the bale growth rate and the apparatus configured to further manipulate the speed of the baling chamber in response thereto. The variable speed baler may further comprise a user input means for receiving a speed variable from an operator. For example, a user input means may receive a desired speed from an operator based on the characteristics of the crop to be baled. The variable speed baler may further comprise one or more sensors to determine the various operational cycles of the baling mechanism and the baler configured to manipulate the baling chamber in response. In one example embodiment, the baler is configured to manipulate the speed of the baling chamber in response to a characteristic of accumulated crop material, the detected growth rate of a bale in the bale chamber, a user-provided speed, and the detected operational cycle of the baler.

An example method comprises determining a characteristic of accumulated crop material; receiving accumulated crop material in the baling chamber; and varying the speed of the baling chamber in response thereto. The method may further include determining the rate of bale growth of a bale in the baling chamber and manipulating the baling chamber speed in response thereto. The method may further include receiving a control input from an operator and manipulating the baling chamber speed in response thereto. The method may further comprise determining an operational cycle of the baler and manipulating the baling chamber speed in response thereto.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

As required, example embodiments of the present invention are disclosed herein. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention.

It should be noted that whereas the example embodiments are discussed in the context of a baler having an accumulation region provided on a conveyor and a pickup configured to provide the crop material to the conveyor. But the invention is not so limited and alternate arrangements could be used. For example, in an alternate embodiment, the crop material could be provided directly to the accumulation region, such as by a combine.

Figure 1:
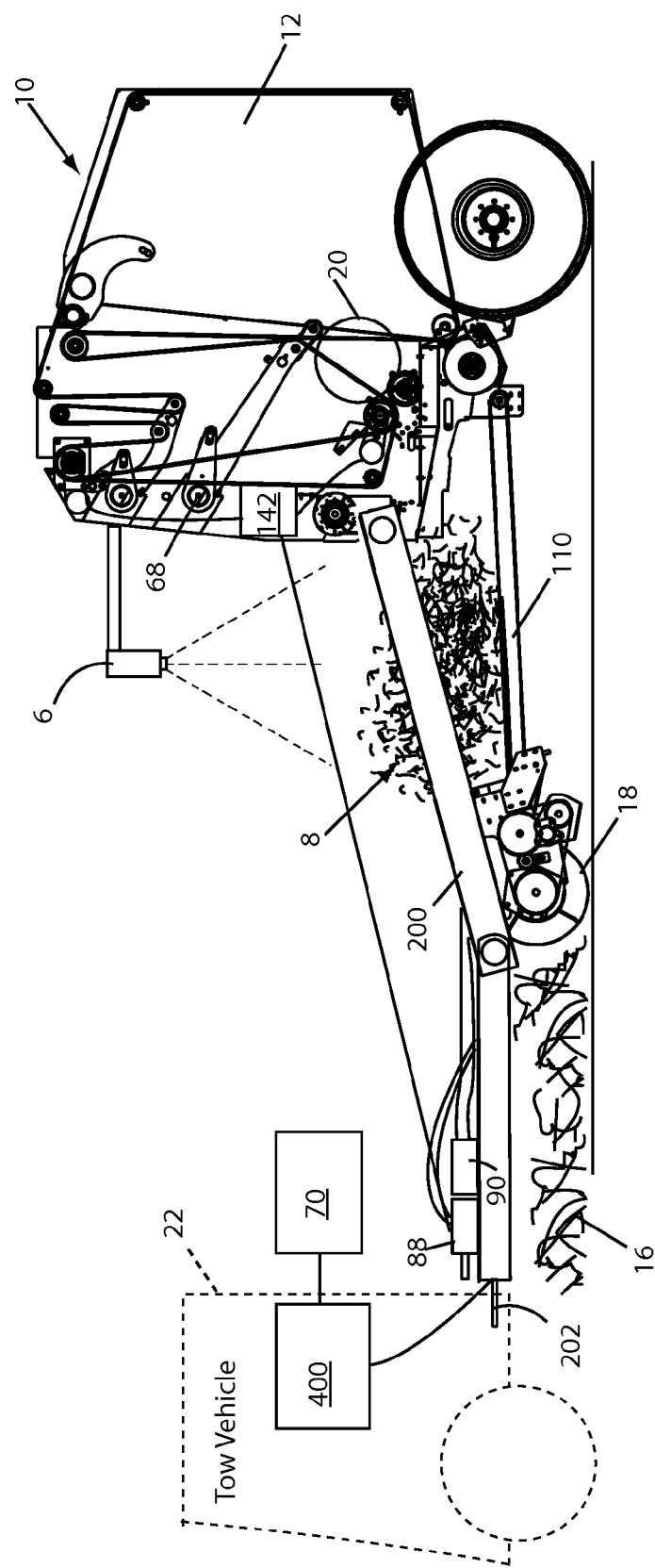
FIG. 1 shows a schematic of an example embodiment of a variable speed round baler.

Turning to the figures, FIG. 1 shows a schematic of a variable speed baler 10 that includes a baling chamber 12 configured for forming a bale 20 and a variable speed drive 14 for varying the speed of the baling chamber 12. A vehicle, such as a tractor 22 may be used to power the baler 10 and pull it through the field. A pickup assembly 18 may gather crop material 16 from the ground and provide it to an accumulation area 8 of a conveyor 110 which feeds the crop material 16 into the baling chamber 12. An accumulation sensor 6 is configured to determine a characteristic of the accumulated crop material 16 in the accumulation region 8. A bale size sensor 68 is configured to determine the size of the bale 20 in the baling chamber 12. A user interface 400 may be provided to allow a user to input data such as a desired baling chamber speed.

Figure 2:
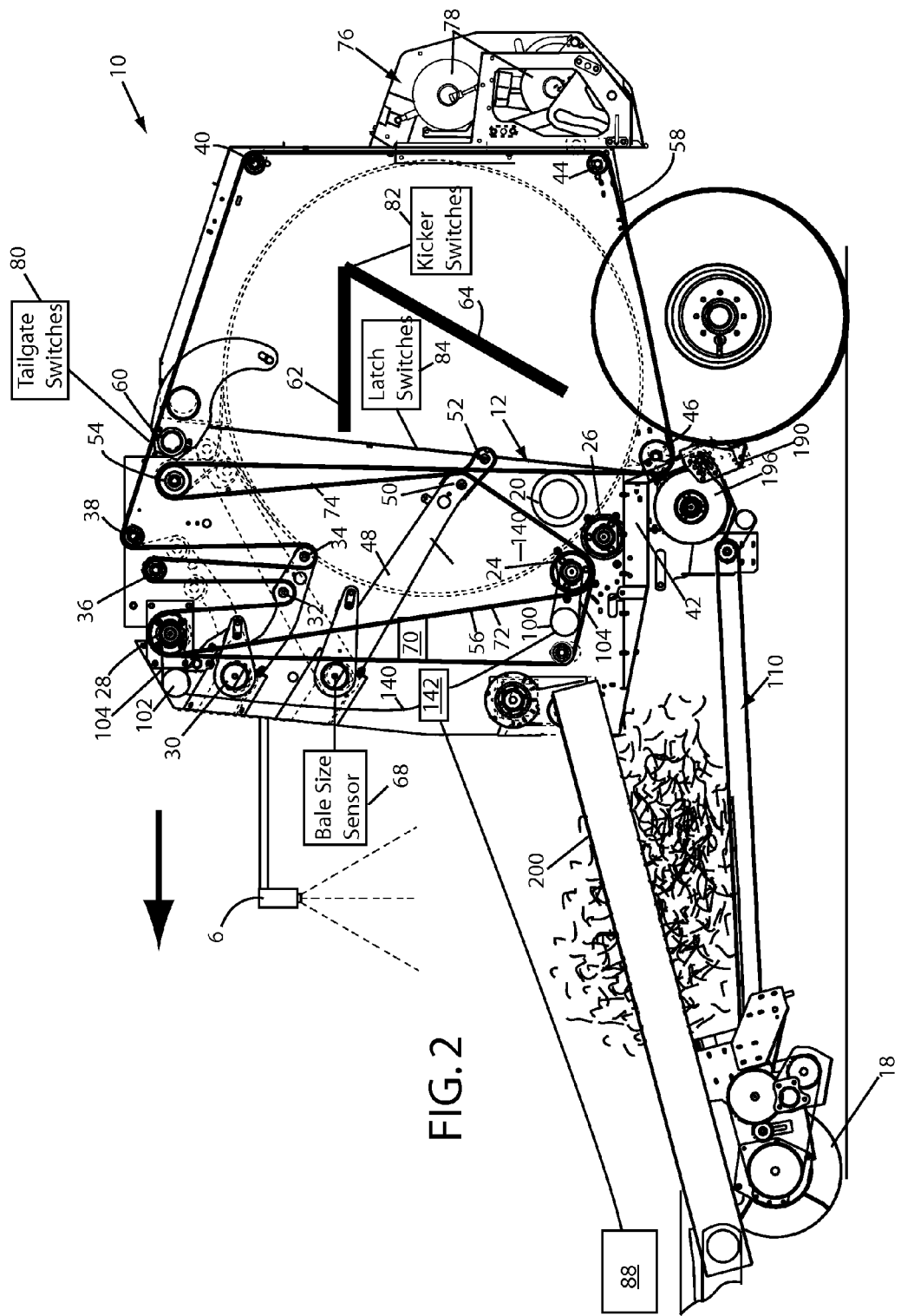
FIG. 2 shows a schematic of an example embodiment of a variable speed round baler.

As shown in FIG. 2, the baler 10 may be generally similar to the balers produced by AGCO Corporation, such as those disclosed in U.S. Pat. Nos. 7,337,713; 6,477,824; 6,675,561; 4,850,271; and 4,524,867, all of which are assigned to the Applicant of the present invention and incorporated by reference in their entirety herein. The baling chamber 12 of the baler 10 may comprise a number of rolls and belts that cooperate to assume different shapes and sizes throughout a bale-forming cycle. In this respect, the example round baler 10 may be referred to as a "variable chamber" belt type machine, wherein the baling chamber 12 is initially small, and then grows progressively larger as the bale 20 increases in diameter within the baler 10. It will be appreciated, however, that the principles of the present invention are also applicable to a "fixed chamber" machine (not shown) in which the dimensions of a baling chamber are at least substantially constant throughout the baling cycle.

With the foregoing general explanation in mind, in the example embodiment shown in FIG. 2, a bale forming chamber 12 includes a lower drive roll 24 and a starter roll 26. Above the lower drive roll is an upper drive roll 28. Pivotally mounted within the baler is a belt tension arm 30 to which are pivotally mounted the front belt tension roll 32 and a rear belt tension roll 34. At the top of the front portion of the baling chamber are a front upper idler roll 36 and a rear upper idler roll 38. Following the interior of the baler wall around clockwise, there is a tailgate belt roll 40, a lower rear tailgate roll 44, and front lower idler roll 46. A bale density arm 48 is pivotally mounted within the baler and has a front bale density roll 50 and a rear bale density roll 52, both pivotally mounted on the distal end from the pivotal mounting of the bale density arm 48. Near the top of the baling chamber above the bale density a roll is depicted an upper baling chamber roll 54. A plurality of bale forming belts 56 (one shown in profile) are threaded around each of the above identified rolls as depicted in FIG. 2. The bale forming belts are tensioned by the front and rear belt tension rolls 32, 34, mounted on the belt tension arm 30 and the rolls 50, 52 mounted on the bale density arm 48.

The baling chamber 12 is open at the bottom to provide a chamber inlet 42 defined generally between the starter roll 26 and the idler roll 46. The baling chamber 12 may be located above and off the ground and a means provided for picking up crop material and delivering the picked-up material into the baling chamber 12. In the example embodiment a conveyor 110 is used to provide crop material to the baling chamber and provide an accumulation area 8 for crop material 16. In the example embodiment, a pickup header 18 having a standard resilient rotary rake tine assembly for picking crop material 16 up off the ground may be used to provide crop material 16 to the conveyor accumulation area 8.

Windrowed crop material 16 may be fed into the baler 10 by the pickup assembly 18 and moved to the chamber inlet 42 and fed into the bottom of the open throat baling chamber 12 by the conveyor 110 of a pickup-conveyor type arrangement where the pickup 18 is displaced from the baling chamber 12. When in the baling chamber 12, the crop material 16 contacts the surface of a belt stretch 74 which is moving upward. The forming belts 56 may be driven by the upper 28 and lower 24 drive rolls so that the forming belts 56, 72 carry the crop material 16 to the top of the baling chamber 12 and the motion of the forming belts 56, 72 turns the crop material 10 downward against the starter roll 26 so that a core is started and begins to roll. The crop material 16 may be initially formed into a small bale 20 within the baling chamber 12 and the process continued to form an enlarged bale of a desired size. Although not illustrated in detail, it will be appreciated by one of ordinary skill in the art that the baling chamber 12 may initially assume a generally vertical, triangular configuration when the baling chamber 12 is empty and enlarge as the bale 20 grows in size (shown in dashed lines in FIG. 2).

Once a bale 20 of crop material 16 reaches its full size, it may be desirable to wrap the bale 20 before discharging it from the baling chamber 12. Thus, the baler 10 may further broadly include a wrapping apparatus 76 for wrapping a formed bale 20 with a wrapping material 78 once the bale-forming cycle has been completed.

The bale wrapping apparatus may be configured to wrap the bale 20 in mesh or twine as known in the art. In the example embodiment shown in FIG. 2, the wrapping apparatus 76 may be a mesh wrap similar to that disclosed in U.S. Pat. Nos. 6,050,052 and 7,946,095 both of which are assigned to the assignee of the present application and both of which are hereby incorporated herein in their entirety and will not be discussed in detail. It should be noted, however, that the bale 20 is rotated by the baling chamber 12 during a bale wrapping cycle and that the variable speed drive 14 may be used to manipulate the speed of the baling chamber 12 and hence the rotation of the bale 20 during the bale wrapping cycle.

The example baler includes a tailgate 58 that opens and closes around pivot point 60. A bale kicker assembly 62 (shown schematically) is associated with the tailgate. The bale kicker assembly includes the bale push bar 64 (depicted in its home position) and hydraulic cylinders (not shown). The bale kicker is used to prevent contact between the tailgate 58 and the bale when the tailgate is closing. After the tailgate rises, hydraulic pressure is applied to the base end of the kicker hydraulic cylinders. The bale push bar 64 rises upward and rearward pushing the bale away from the tailgate before the tailgate closes. After the tailgate 58 is closed the kicker is returned to its home position.

The various baling operational cycles of the baler may be controlled by a controller 70 (FIG. 1). The controller 70 may be positioned on or near the round baler 10 and an associated user interface 400 that may be positioned on the tow vehicle 22 towing the baler 10. The controller 70 may receive data from a variety of different sensors and in response issue commands to effect various operations of the baler 10. Although the controller 70 and the user interface 400 are preferably separate components, their functions could also be combined into a single unit positioned either on the baler 10 or its towing vehicle.

The baler controller 70 may be used to control the operation of the baler 10, including its various operational cycles, such as the bale forming, bale wrapping, and bale ejecting cycles and the speed of the baling chamber 12. For example, a bale size sensor 68 (shown schematically) may determine the bale size of the bale 20 in the baling chamber 12 and provide a corresponding signal to the controller 70 and the user interface 400. For example, the bale size sensor 68 may send signals to an electronic control system to indicate the bale size during the bale forming cycle.

An accumulated crop material sensor (ACMS) 6 may be provided to determine one or more characteristics of the accumulated crop material 8. In an example embodiment, the ACMS 6 is in the form of an ultrasonic height sensor configured to detect the height of the accumulated crop material 16 on the conveyor 110. Although in this example embodiment the sensor 6 is an ultrasonic sensor configured to detect height, other type sensors may be used and other characteristics detected. The detected height of the accumulated crop material 16 may be provided from the ACMS 6 to the controller 70 for determining a desired baling chamber speed. As shown in FIG. 2, the ACMS 6 may be mounted to the baler 10 by a support frame 4, such as by cantilevered support members 2 so as to have an overhead detection view of the accumulation area 8 of the conveyor 110. The controller 70 may use the detected height of the accumulated crop material 16 to determine a desired operational speed of the baling chamber 12 and issue commands to effectuate the desired operational speed.

The baler 10 may include various components to receive information and effectuate the various modes of the baler. For example, the baler may include tailgate switches 80 (shown schematically) that detect the position of the tailgate whether opened or closed, kicker switches 82 (shown schematically) that detect the position of the kicker whether out or home, and latch switches 84 (shown schematically) that detect whether the tailgate is latched. The tailgate and kicker switches cause signals to be sent to the controller 70 indicating the status of the elements to which they are connected. The controller 70 may then use the information to move the baler 10 through the various operational modes and vary the speed of the baling chamber 12 accordingly.

Power for operating the components of the baler 10 can be delivered by a drive line 202 associated with a tongue 200 of the baler. A front end of such a drive line can be adapted for connection to the power take-off shaft (not shown) of the towing vehicle, while the rear end of the driveline can be coupled with various drives, pumps, and/or other components for the driving the various baler components. In the example embodiment, shown in FIG. 1, the baler 10 can include a variable displacement pump 88 used for baler speed control and an open circuit pump 90 that may be used to power various components such as hydraulic motors and cylinders to operate the tailgate 58, conveyor 110, pickup 18, and auxiliary controls. The baler 10 may also include a clutch assembly and control electronics, neither of which is shown, but which may be used in operation of the baler as understood by one of ordinary skill in the art.

In the example embodiment shown in FIGS. 1 and 2, the baling chamber may be powered by a variable speed drive in the form of a hydrostatic system. For example, the bale forming belts 56 may be driven by the lower 24 and upper 28 drive rolls whose rotation results in movement of the bale forming belts 56. The drive rolls 24, 28 may in turn be powered by hydraulic motors 100, 102. For example, fluid may be provided to the hydraulic motor 100, 102 from the hydraulic pump 88 and manipulated by solenoids and/or flow control valves to vary the fluid flow to vary the speed of the motors 100, 102. The drive rolls 24, 28 may be coupled to the motors 100, 102 by a chain 104 or other means as known in the art so that varying the speed of the motors 100, 102 varies the speed of rotation of the drive rolls 24, 28 and the bale forming belts 56 powered by the drive rolls 24, 28 and therefore the rotational speed of the bale 20.

This arrangement allows the rotational speed of the bale 20 in the baling chamber 12 to be controlled by the controller 70 by varying the speed of the forming belts 56. This speed may be varied in response to one or more characteristics of the accumulated crop material 16 and other criteria such as the operational cycles of the baler 10. In an example embodiment, the hydraulic pump 88 may be mounted on the baler tongue 200 and powered by a power takeoff (PTO) mechanism of the tow vehicle 22. Hydraulic lines 140 may extend to a manifold 142 mounted in the baler 10 and be coupled to solenoids and/or flow control valves that respond to command signals sent from the controller 70 to manipulate hydraulic fluid provided to the motors 100, 102.

Figure 3:
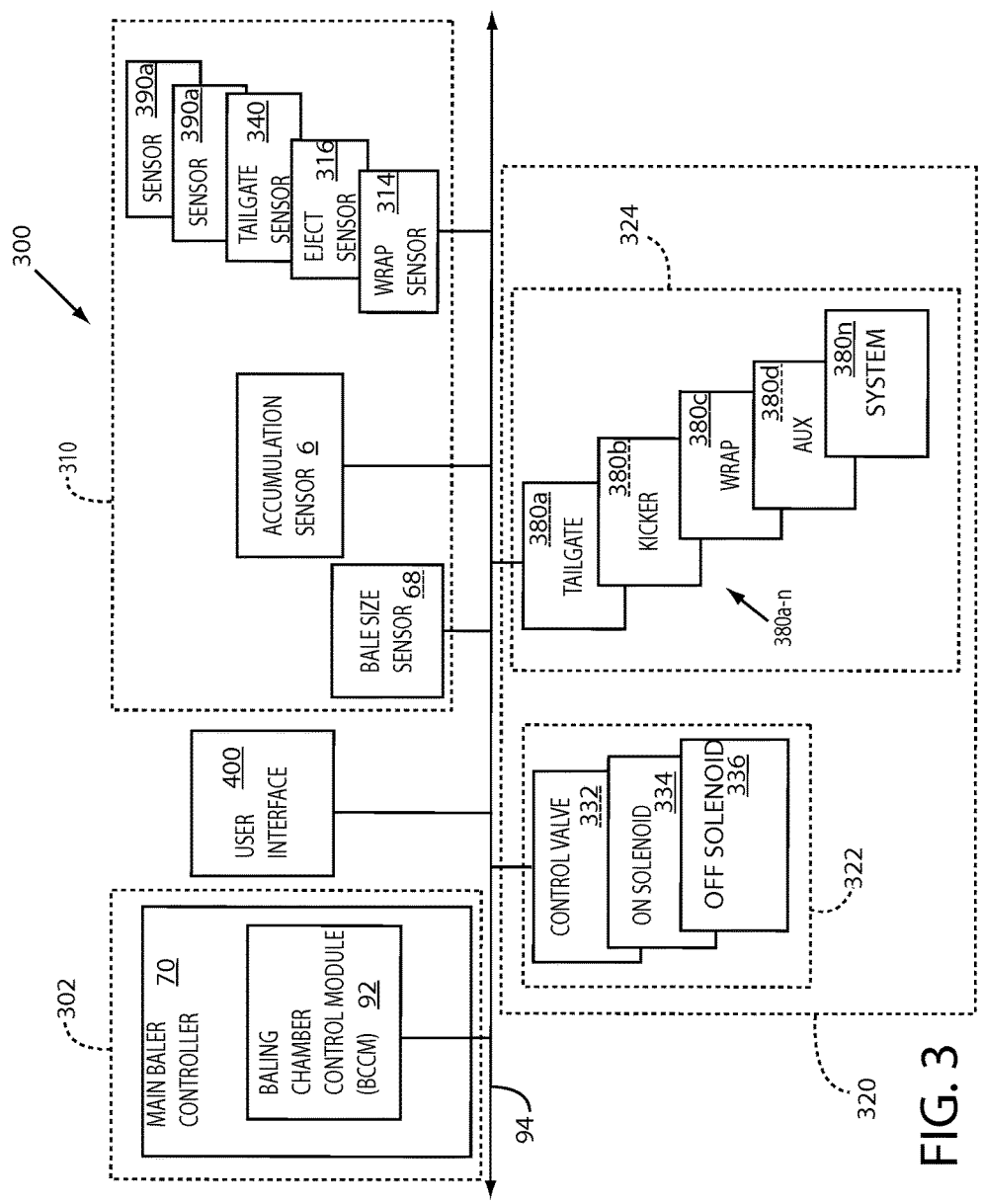
FIG. 3 shows a block diagram of an example embodiment of a variable speed baler system.

FIG. 3 is a schematic drawing of an embodiment of an electronic control system 300 of the baler 10 of FIG. 2. The system 300 comprises a system box 302 containing a controller 70 and associated electronic components whose construct will be understood by one of ordinary skill but the details of which are unimportant to the present invention. The arrangement may be comprised of hardware, software, firmware or combination thereof as would be apparent to one of skill in the art. For example, the controller 70 may be a microcontroller capable of receiving data and issuing commands for the control of various systems and components in accordance with particular schemes that may be programmed into the microcontroller. In this example, the various components of the control system 300 may communicate via a data bus such as a CAN bus 94 commonly found in agricultural equipment and known to one of ordinary skill in the art.

Communicatively coupled to the system box 302 and the controller 70 are a sensor box 310 for providing data to the controller and a control box 320 for receiving commands from the controller 70 and effectuating various operations of the baler. In this example, for purposes of clarity, the control box is shown as containing a baling chamber control box 322 for controlling the baling chamber and a second control box 324 for controlling other components of the baler.

The sensor box 310 may comprise one or more sensors for communicating information to the controller 70 for use in generating various command signals. In the example embodiment shown in FIG. 3, the sensor box 310 includes an accumulated crop material sensor (ACMS) 6, a bale size sensor 68, a bale wrap sensor 314, and a bale eject sensor 316 for providing information to the controller 70 regarding the operation of the baler 10.

The ACMS 6 may detect a characteristic, such as height, of crop material accumulated at an accumulation region 8, such as on the conveyor 110. The bale size sensor 68, may indicate the size of the bale 20 within the baling chamber 12 and be used by the controller 70 to determine whether the bale is growing or shrinking in size. The bale size sensor 68 may also be used to indicate when the controller 70 should direct the baling chamber 12 to exit a bale-forming mode enter a bale-wrap mode as well as the growth rate of a bale 20 in the baling chamber. The wrap sensor 314 may indicate when a bale wrapping operation is complete and the controller should direct the baling chamber to enter an eject mode. The bale eject sensor 316 may indicate when the bale ejection operation is complete and the controller should direct the baling chamber to enter the bale-forming cycle. For example, the bale eject sensor 314 may be a tailgate latch switch 84 that indicates when the baler tailgate 58 closes after the bale is ejected. Various other sensors 390a-n may also be employed. A user input means 400 may also be provided to allow an operator to enter a desired baling speed for use by the controller 70.

Various elements controlled by the controller 70 may be distributed about the round baler 10 and will not be discussed in detail. For example, the system box 302 and controller 70 may be coupled to solenoids and control valves to operate hydraulic devices, cylinders and other devices 380a-n to open and close the tailgate 58, operate the kicker assembly 62 to eject the bale, operate the wrap assembly 76 to wrap the bale 20, and perform other operations of the baler.

As seen in FIG. 3, the controller 70 may be communicatively coupled to the control box 320. In the example embodiment shown in FIG. 3 the control box 320 includes both a baling chamber control box 322 and another control box 324. The baling chamber control box 322 may control components 360 that are powered by the variable displacement pump 88 and effectuate changes in the speed of the baling chamber. The other control box 324 may control components 380a-n that are powered by the open circuit pump 90 that effectuate various other systems of the baler such as the bale wrapper 76, the kicker 62, and tailgate 80.

The baling chamber control box 322 may comprises a flow control valve 332, a baling chamber on solenoid on 334, and a baling chamber off solenoid off 336 that are controlled by the controller 70 and used to manipulate the operation of the forming belts 56 in response to commands from the controller 70. For purposes of teaching and not limitation, in the example embodiment shown in FIG. 3, the controller 70 is shown as including a baling chamber control module BCCM 92 configured to control the speed of the baling chamber based on a variety of inputs. For example, the BCCM 92 may receive data input via the bus 94 from a variety of sources including an ACMS 6, a user interface 400, a bale size sensor 68, a baler wrap sensor 314, a bale eject sensor 314, and other sensors 96, detectors, or the like and determine a desired baling chamber speed in response thereto. To effectuate the baling chamber speed the BCCM 92 may issue commands to the baling chamber control box 322, such as issuing commands to a baling chamber on solenoid 334, a baling chamber off solenoid 336, and a baling chamber flow control valve 332 (all shown schematically in FIG. 3) to control the hydraulic motors 100, 102 and thus the movement of the bale forming belts 56. While the BCCM 92 is shown as part of the main baler controller 70 it could be arranged as a separate controller or incorporated entirely into the controller 70.

For example, the controller 70 may issue commands to change the flow of fluid to the hydraulic motors 100, 102 to change the speed of the motors and the forming belts 56. While not discussed in detail, one of skill in the art will recognize that the controller and pump 88 could be used for manipulating other components of the baler 10, such as the starter roll 26.

The controller 70 may also receive input from the various sensors and send control signals to various solenoids, valves, and the like to manipulate other baler components. For example, the controller 70 may receive input from a bale eject sensor 316, a bale wrap sensor 314, a tailgate sensor 340, and other sensors 390a-n, which may include the tailgate switch 80, kicker switch 82, latch switch 84 shown in FIG. 2, to determine the desired operational mode of the baler. When the desired mode is determined, the controller 70 may issue the commands to effectuate the various operational cycles. For example, the controller 70 may send commands to solenoids, control valves, 380a, 380b, 380c, 380d, 380n associated with the various components, such as the tailgate 58, the kicker assembly 62, the wrapping apparatus 76, and auxiliary and other systems.

Thus, various sensors can be used by the controller 70 to control the operating cycles of the baler 10 and the movement of the bale forming belts 56. For example, the controller 70 may direct the baler 10 to begin a bale forming cycle and operate the baling chamber 12 at a first speed if the bale size sensor 68 indicates that the bale 20 is less than a predetermined size and to operate the baling chamber 12 at a second speed if the bale size sensor 68 indicates that the bale 20 is equal to or greater than the predetermined size. Likewise, the controller 70 may direct the entry of the bale wrapping cycle when the bale reaches a particular size, direct entry of the bale ejection cycle when the wrapping cycle is complete, and stop the bale forming belts 56 during a bale ejection cycle. Upon completion of the ejection cycle, the controller may restart the forming belts 56 to form a new bale. For example, when sensors, such as the tailgate switch 80, indicate that the bale 20 has been ejected from the baler 10, the controller 70 may begin a new bale forming cycle and restart the baler belts 56.

The baling chamber 12 may further be manipulated by the controller 70 and BCM 92 in response to characteristics of the accumulated crop material. In one example scheme that may be used, the baling chamber 12 may be driven at different speeds in response to a characteristic of the accumulated crop material 16, a desired speed provided by an operator, and the various operation cycles of the baler 10. For example, if the baler is in a baling mode and not in a bale wrap or bale eject mode, then the height of the accumulated crop material in an accumulation region 8 of the conveyor 110 may be determined. If the height is greater than a predetermined height, which also may be user-proved, then the baling chamber 12 may be run at full speed. If the height of the accumulated crop material 16 is less than or equal to a predetermined height, then the rate of change of bale size may be determined. If the bale change size rate is positive, i.e., it is growing in size, then the baling chamber may be run at a designated rate, such as a desired rate provided by the operator. If the bale growth rate is less than zero, that is the bale size is getting smaller, then a determination may be made as to whether the height of the accumulated material is greater than a second predetermined height, which also may be user-provided. If not, then the baling chamber 12 may be stopped, as the bale is not properly forming. If the height of the accumulated crop material is greater than the second predetermined height, then the baler may be run at the operator set speed. The bale size growth rate may be calculated by dividing data of the bale size sensor by time.

Figure 4:
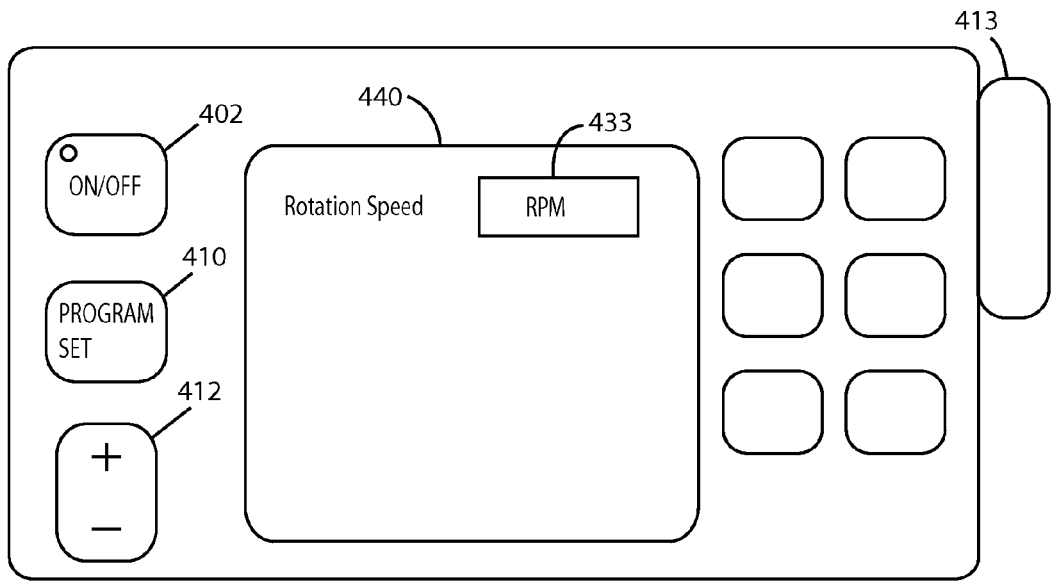
FIG. 4 shows an example embodiment of a user interface for use with a variable speed baler.

FIG. 4 is a plan view of an operator interface that may be used as a user input means in the form of a control console 400 provided at an operator's station, such as in the cab of a tow vehicle 22 that pulls the baler 10 through the field. The control console 400 may be configured with controls to provide the operator with varying degrees of control over various aspects of the baler 10. The control console 400 may include a variety of other controls for controlling various other parts of the baler 10 such as the pickup 18, clutch (not shown), tailgate 58, kicker 62, wrapper assembly 76, etc. which are omitted for purposes of clarity. The control console 400 may also be configured to operate in different modes of operation such as a manual mode or an automatic mode. For example, the operator may be provided with manual control mode of the round baler or automatic control mode. In full manual control mode the operator may initiate various operational cycles of the baler 10, whereas in the automatic mode the various cycles may be initiated automatically with little or no operator assistance.

In the example embodiment 400 shown in FIG. 4, the control console 400 includes a power on/off button 402, a program set button 410, a value control button 412. In addition, there may be a variety of other control buttons for operating other features of the baler that will not be described in detail. There is also a central display 440 that indicates baler status to the operator. In addition to the control console 400, a remote control (not shown) may also be used to handle some control functions including the cycle start function described below.

The operator may use the operator interface 400 to set the various settings of the baler for use by the controller 70. For example, when the program set key 410 is pressed a program mode symbol may illuminate and a setting name and value shown on the display screen 440. To change a value or setting option, the operator can press the appropriate side of value key 412. The program set button 410 can be pressed again to advance to the next setting name. Among other values and settings, the operator can select a desired speed of the baling chamber 12 for use by the various schemes employed by the controller 70. For example, the operator may select a desired baling chamber speed for an occurrence in which the height of the accumulated crop material is less than a predetermined height. The operator could also use the keys 410, 412 to provide one or more predetermined heights for use with the detected height of the accumulated material in determining baler speed.

If an operator chooses an automatic mode then the baler 12 may advance through the various operational cycles under the control of the controller 70. As mentioned above, the operator may provide input, such as a value for a desired baling chamber speed and a value for a predetermined height of accumulation material which may be used by the controller 70 in operating the baler. For example, the operator could use the program set key 410 to move to move to a program mode for inputting a desired speed variable for the baling chamber by using the value key 412. In one example embodiment, the operator may put in a variable between 0.1 (slow) and 1.0 (fast). The controller could then use this input for determining a baling chamber speed. Likewise, the operator could input one or more values for the height of accumulated crop material, such as a number of inches, for use by the controller 70.

The baling chamber 12 may operate with the use of a variable displacement pump in a closed circuit hydrostatic system in which the flow speed control is controlled by the pump or an open-circuit system having various on/off valves and solenoids. For example, a variable displacement pump 88 may receive energy from the power take-off of the tow vehicle 22 and pressurize the system and manipulate hydraulic fluid flow and in an open-circuit system the controller 70 may send signals to operate the on solenoid 334 and baler flow control valve 332. Regardless of the system employed, the controller 70 may send signals to provide the necessary operation to cause the hydraulic motor(s) 100, 102 to operate and the starter roll 26 to turn, and the upper and lower drive rolls 24, 28 to turn the forming belts 56.

Crop material 16 is picked up by the pickup 18 and provided to the conveyor 110. The ACMS 6 measures the height of the accumulated crop material 16 at an accumulation region 8 on the conveyor 110. This information is sent to the controller 70. In response, the controller 70 may manipulate the speed of the baling chamber 12 by sending appropriate command signals to the various baler components. For example, the controller 70 may send a signal to the baler control box 322 including the baler flow control 332 to speed or slow down the forming belts 56 to increase or decrease the rotational speed of the bale 20.

The conveyor 110 provides the crop material 16 to the baling chamber. For example, the crop material 16 may be fed into the bottom of the open throat baling chamber 12 by a feeder 196. Once in baling chamber 12, the crop material 16 contacts the rough top surface of forming belts 56 which are moving upward. The forming belts 56 carry the crop material 16 to the top of the starting chamber which is formed by the front and rear bale density rolls 50, 52. The motion of the forming belts 56 turns the crop material downward against starter roll 26. The core is started and begins to roll. Hydraulic cylinders pull down on the bale density arm 48 and belt tension 30 arms. The bale density rolls 50, 52 are held down to reduce the size of the baling chamber to a starting size. The belt tension rolls 32, 34 are held down to supply tension to the forming belts. As the bale increases in size, the bale density rolls 50, 52 and the belt tension rolls 32, 34 are forced up. The bale density rolls 50, 52 put downward force against the bale. This force keeps tension on the bale and compresses the crop material coming into the baling chamber. The belt tension rolls move upward to provide more forming belt for the increased size of the bale within the chamber.

As the bale size increases and bale density arm 48 moves upward, the bale size sensor 68 continually sends signals to the controller 70 indicating the bale size. The controller 70 will detect when the bale has reached or exceeded a desired bale size, which may have been originally programmed during the program mode by the operator. The bale size may also be indicated on the console screen 440. When the bale size has reached or exceeded the predetermined bale size, the baler 10 enters the wrapping cycle and the baling chamber rotational speed changes in response to the new baler mode. For example, the controller 70 may send a signal to the baler flow control 332 to speed up the forming belts 56 during the wrapping cycle to increase the rotational speed of the bale 20. The controller may also send a signal to the wrapping mechanism 76 to start the bale wrapping cycle. Similarly, the controller may proceed to a bale ejection cycle upon completion of the wrapping cycle.

The bale size sensor 68 may also be used to determine the rate of growth of the bale 20 in the baling chamber. This information may then be used by the controller 70 in manipulating the baling chamber speed. For example, the rate of change in the bale size may be determined by dividing data from the bale size sensor by time to obtain a A size. This allows determination as to whether the bale is growing or shrinking in size. The height of the accumulated crop material and whether the bale is growing in size may be used by the controller 70 to determine a speed of the baling chamber in accordance with a predetermined scheme. In one example embodiment, the speed of the baling chamber may be manipulated in a linear fashion with the detected bale growth rate. If the detected growth rate is determined to be slowing, then the baling chamber speed may be slowed as well. Likewise, if the detected bale growth rate is increasing, the speed of the baling chamber may be similarly increased.

Figure 5:
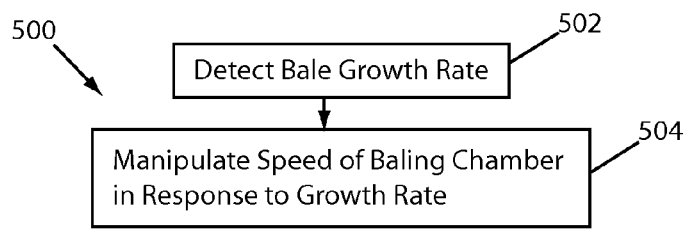
FIG. 5 shows a flow diagram of an example embodiment of a method of operating a variable speed baler.

FIG. 5 shows a flow diagram of an example embodiment 500 of the operation of a variable speed baler in which the speed of the baling chamber is manipulated in response to a growth rate of a bale. At block 502 the growth rate of the bale is determined. At block 504 the speed of the baling chamber is manipulated in response to the growth rate. As mentioned above, the baling chamber speed may be manipulated in a linear relationship with that of the bale growth rate.

Figure 6:
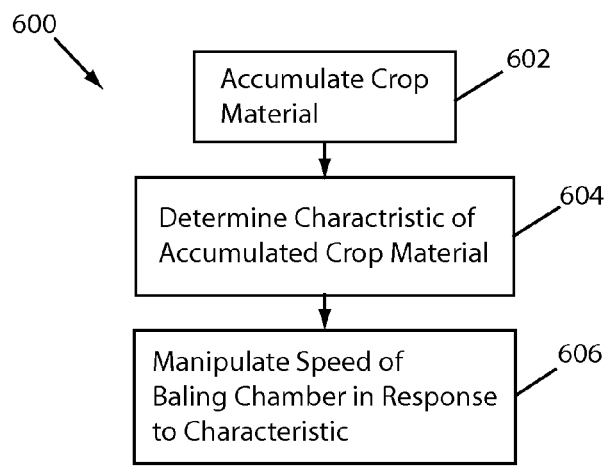
FIG. 6 shows a flow diagram of an example embodiment of a method of operating a variable speed baler.

FIG. 6 shows a flow diagram of an example embodiment 600 of the operation of a variable speed baler 10. At block 602 crop material 16 is accumulated in an accumulation region 8 of the baler 10. For example, the pickup 18 may provide crop material 16 to an accumulation region 8 of a conveyor 110 configured to provide the crop material 16 to a baling chamber 12. At block 604 a characteristic of the accumulated crop material is determined. For example, the height of the accumulated crop material may be determined by a sensor 6. At block 606 the speed of the baling chamber is manipulated in response to the characteristic of the accumulated crop material.

Figure 7:
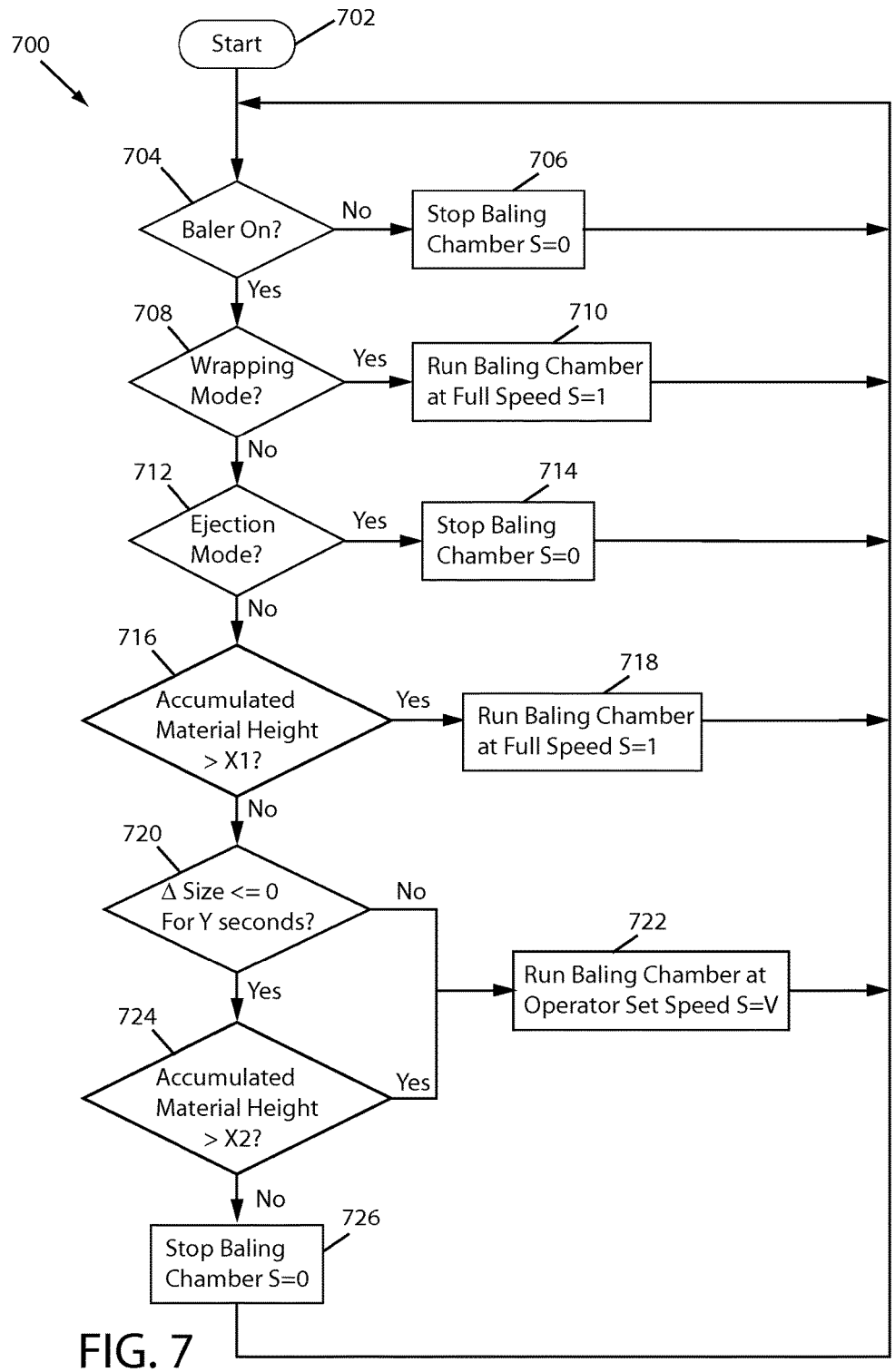
FIG. 7 shows a flow diagram of an example embodiment of a method of operating a variable speed baler.

FIG. 7 shows an example flow diagram 700 of the operation of a variable speed baler 10. At block 702 the baler is started. For example, as discussed above, an operator may start the baler 10 using the on/off key 402. At block 704 a determination is made whether the baler 10 is on. If not, then the baler speed is set to 0 (stopped) at block 706. If the baler is on, then at block 708 a determination is made as to whether the baler is in bale wrapping mode. For example, the controller 70 may receive information from a sensor, such as a bale size sensor 68 that the bale 20 is of sufficient size for wrapping and the controller 70 may then issue commands to initiate the bale wrapping cycle and the controller notes that the baler is in wrapping mode. If the baler is in the wrapping mode, then at block 710 the baler is run at high speed (S=1). For example, as discussed above, the controller 70 may issue commands to a flow control valve 320 to increase the speed of an associated hydraulic motor 100.

If the baler is not in the bale wrap cycle, then at block 712 a determination is made as to whether the baler 10 is in a bale ejection cycle. For example, a sensor 314 may indicate that the bale wrapping is complete and that the baler 10 should enter a bale ejection cycle at which point the controller 70 may issue the necessary commands to enter the ejection cycle. In that event at block 714 the controller 70 stops the baling chamber (S=0). For example, the controller 70 may activate the baling chamber off solenoid 336 to stop rotation of the baling chamber 12.

If the baler is not in the eject mode at block 712, then at block 716 a determination is made as to whether the height of the accumulated crop material is greater than a predetermined height. For example, the ACMS 6 may determine the height of the accumulated crop material in an accumulation region 8 of the conveyor 110. The controller may then compare this detected value with a comparison value X1. The value of the comparison value X1 may be operator-provided or otherwise held in memory by the controller 70. For example, an operator may use the user interface to provide a comparison value. If the height of the accumulated crop material is greater than the comparison value X1, then the speed of the baling chamber may be changed. For example, the baling chamber may operated at full speed (S=1) at block 718.

If at block 716 the height of the accumulated crop material is not greater than the comparison value X1, then at block 720 a determination is made whether the bale is increasing in size. For example, the bale size sensor 68 may provide bale size information to the controller 70 and this information may be analyzed over time. If the rate of growth of the bale size is not less than or equal to 0 for Y seconds then at block 722, the baling chamber is run as the desired speed (S=V), such as the speed provided by the user.

If at block 720 the A bale size is less than or equal to 0, then at block 724 a determination is made whether the accumulated material height is greater than a second comparison value X2. This comparison value X2 may also be provided by the operator as discussed above. If the height of the accumulated material is not greater than the comparison value X2, then baling chamber is stopped (S=0) at block 726. If the height of the accumulated material is greater than the comparison value X2, then at block 722 the baler is run at the desired value V.

It should be noted that whereas in the example flow 700 in FIG. 7 the speed of the baling chamber is changed automatically by the controller 70, the operator could operate in a manual mode and use the baling chamber control button 460 to change the speed of the baling chamber 12. For example, input from the operator using the fast/slow control button 460 could be used to manipulate the flow control valve 332 in accordance with the operator's preferences.

It should be noted that, whereas three particular operation cycles, bale-forming, bale-wrapping, and bale ejection, have been discussed, the term "cycle" is meant to incorporate other existing or future operations that could be performed by a baler and is not limited to the specific afore-mentioned cycles. Thus, many other cycles could be performed by the baler 10, and the speed of the baling chamber 12 adjusted accordingly.

This arrangement provides for running the baler at full speed in wrap mode and when feeding accumulated material after a cycle of the baler. The baling chamber stops when the bale is ejected. To prevent bale deterioration by running without feeding, for example when turning on end rows, the baling chamber is stopped if the bale size sensor determines that the bale is not growing. If the baler stops in this case, it can be automatically restarted if the height of the accumulated material reaches a certain height X2, which in an example embodiment may be around 5 inches. If none of the preceding conditions are present, the baler will run at a speed set by the operator. The operator may run at high speed for high yielding crops such as sorghum, medium speed for crops such as alfalfa, and lower speeds for crops such as wheat straw.

This system would relate the height of the accumulated material and/or the size change rate, to the baler speed. For example, as the amount of accumulated material decreases, the baler speed could decrease along with it; or if the bale size change rate increases, the baler speed could automatically increase.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method comprising:
    detecting height of an accumulation of crop material to be fed to a round baler with a sensor;
    manipulating the speed of bale forming belts in a baling chamber of the round baler using a controller to control at least one powered drive roll in response to the detected height; and
    determining whether the detected height is greater than a predetermined height, and if the detected height is greater than the predetermined height, running the bale forming belts at full speed.

2. A method comprising:
    detecting height of an accumulation of crop material to be fed to a round baler with a sensor;
    manipulating the speed of bale forming belts in a baling chamber of the round baler using a controller to control at least one powered drive roll in response to the detected height; and
    determining whether the detected height is greater than a predetermined height, and if the detected height is not greater than the predetermined height, determining a bale growth rate value.

3. A method comprising:
    detecting height of an accumulation of crop material to be fed to a round baler with a sensor;
    manipulating the speed of bale forming belts in a baling chamber of the round baler using a controller to control at least one powered drive roll in response to the detected height;
    determining whether the detected height is greater than a predetermined height;
    determining a bale growth rate value; and
    if the bale growth rate is greater than zero running the bale forming belts at a user-provided desired speed.

4. A method comprising:
    detecting height of an accumulation of crop material to be fed to a round baler with a sensor;
    manipulating the speed of bale forming belts in a baling chamber of the round baler using a controller to control at least one powered drive roll in response to the detected height;
    determining whether the detected height is greater than a predetermined height;
    determining a bale growth rate value; and
    if the bale growth rate is less than zero, then determining whether the height of the accumulated crop material is greater than a second comparison value, and if the height of the accumulated crop material is less than the second comparison value, then stopping the bale forming belts.

* * * * *